C. W. CLARK.
ENDLESS TRACK VEHICLE.
APPLICATION FILED NOV. 26, 1921.

1,437,092.

Patented Nov. 28, 1922.
5 SHEETS—SHEET 1.

Inventor:
Charles Willoughby Clark
By his attorneys,
Baldwin Wight

C. W. CLARK.
ENDLESS TRACK VEHICLE.
APPLICATION FILED NOV. 26, 1921.

1,437,092.

Patented Nov. 28, 1922.
5 SHEETS—SHEET 2.

Inventor:
Charles Willoughby Clark.
By his Attorneys
Baldwin Wright

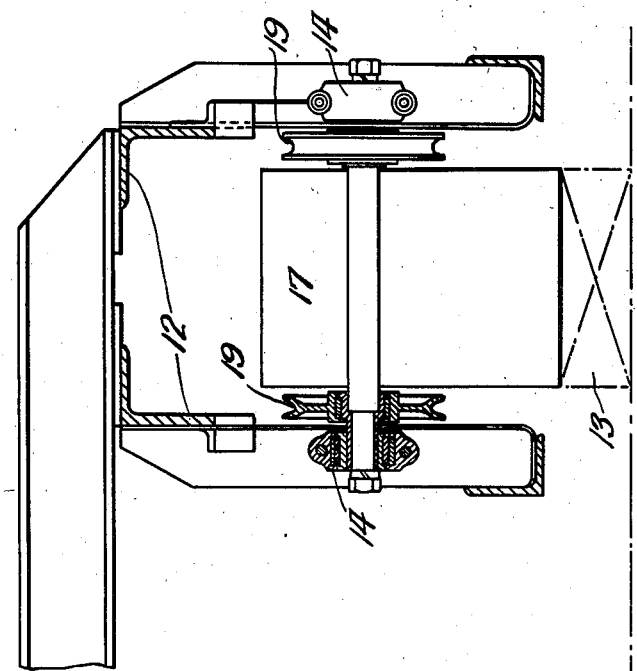
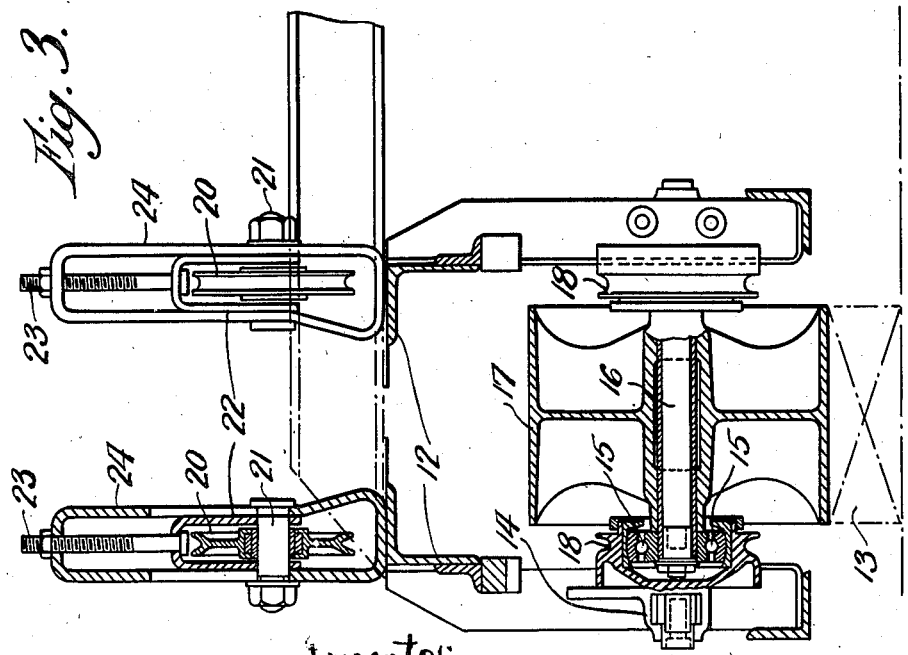

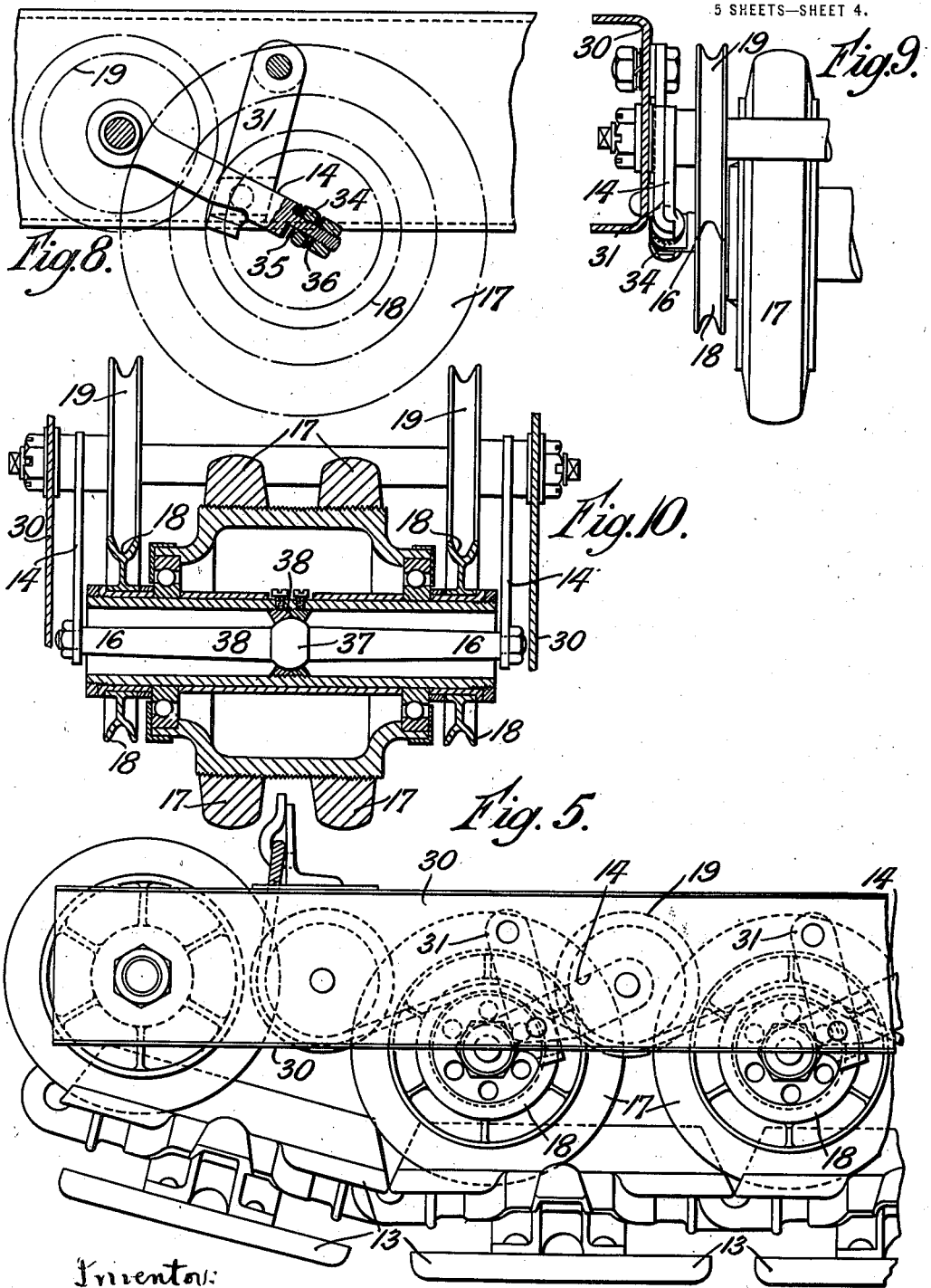

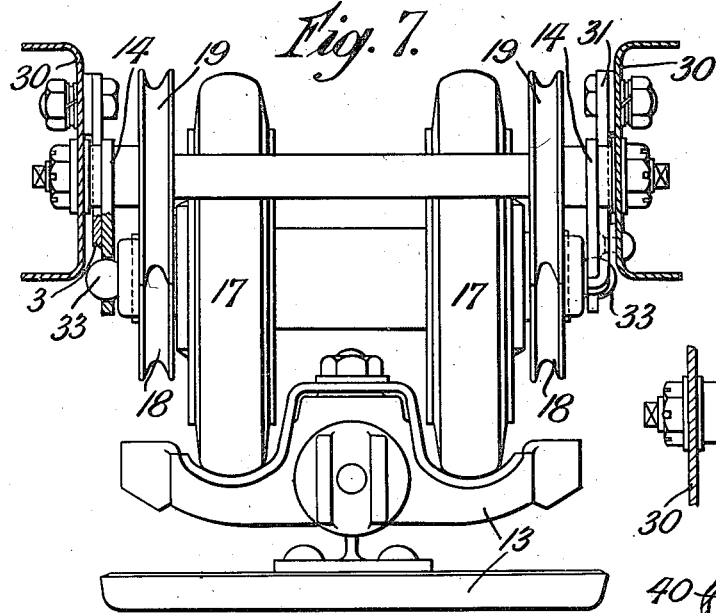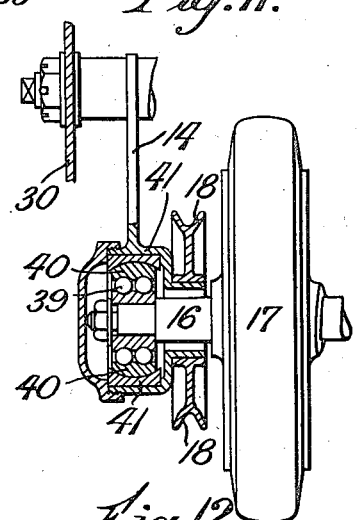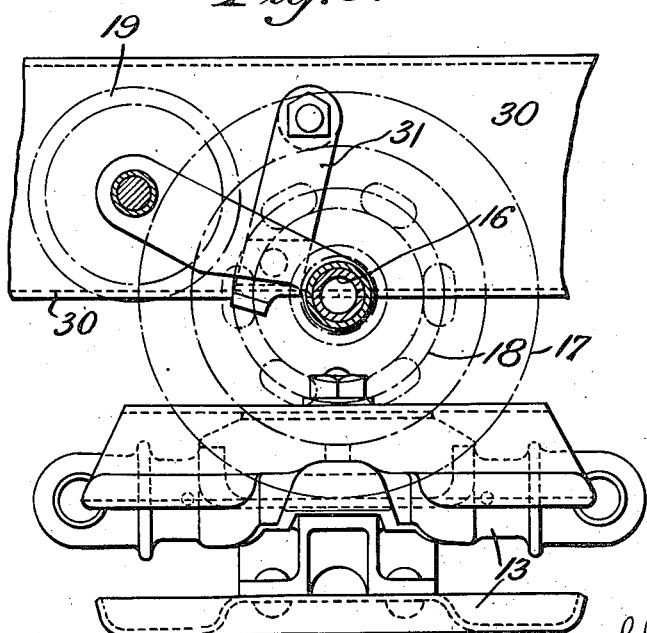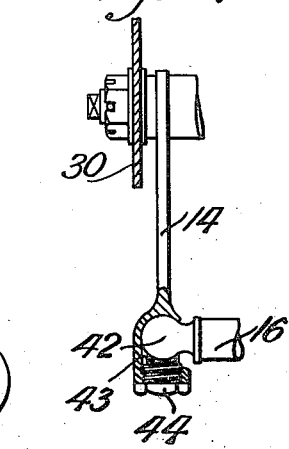

Patented Nov. 28, 1922.

1,437,092

UNITED STATES PATENT OFFICE.

CHARLES WILLOUGHBY CLARK, OF BALSALL COMMON, NEAR COVENTRY, ENGLAND, ASSIGNOR TO ROADLESS TRACTION LIMITED, OF BALSALL COMMON, NEAR COVENTRY, ENGLAND.

ENDLESS-TRACK VEHICLE.

Application filed November 26, 1921. Serial No. 517,930.

*To all whom it may concern:*

Be it known that I, CHARLES WILLOUGHBY CLARK, a subject of the King of Great Britain, residing at Bermicourt, Balsall Common, near Coventry, England, have invented new and useful Improvements in Endless-Track Vehicles, of which the following is a specification.

This invention relates to means of suspension of endless track vehicles, especially those described in the specifications of Philip Henry Johnson, Nos. 1,329,769 and 1,330,119.

The object of the present invention is to allow movement of the endless track against the tension of the suspension rope when the track passes over uneven ground, and also to provide means for securing the rollers which run on the endless track and for allowing the rollers to tilt in their bearings.

According to this invention the rollers which run on the endless track are mounted upon the ends of arms pivotally connected to the frame of the vehicle or a secondary frame upon which the vehicle frame proper is mounted.

Preferably the axles of the rollers are tiltably mounted in bearings at the ends of the arms, so that one edge of the endless track can move independently of the other.

The accompanying drawings illustrate apparatus made in accordance with this invention.

Figure 1:
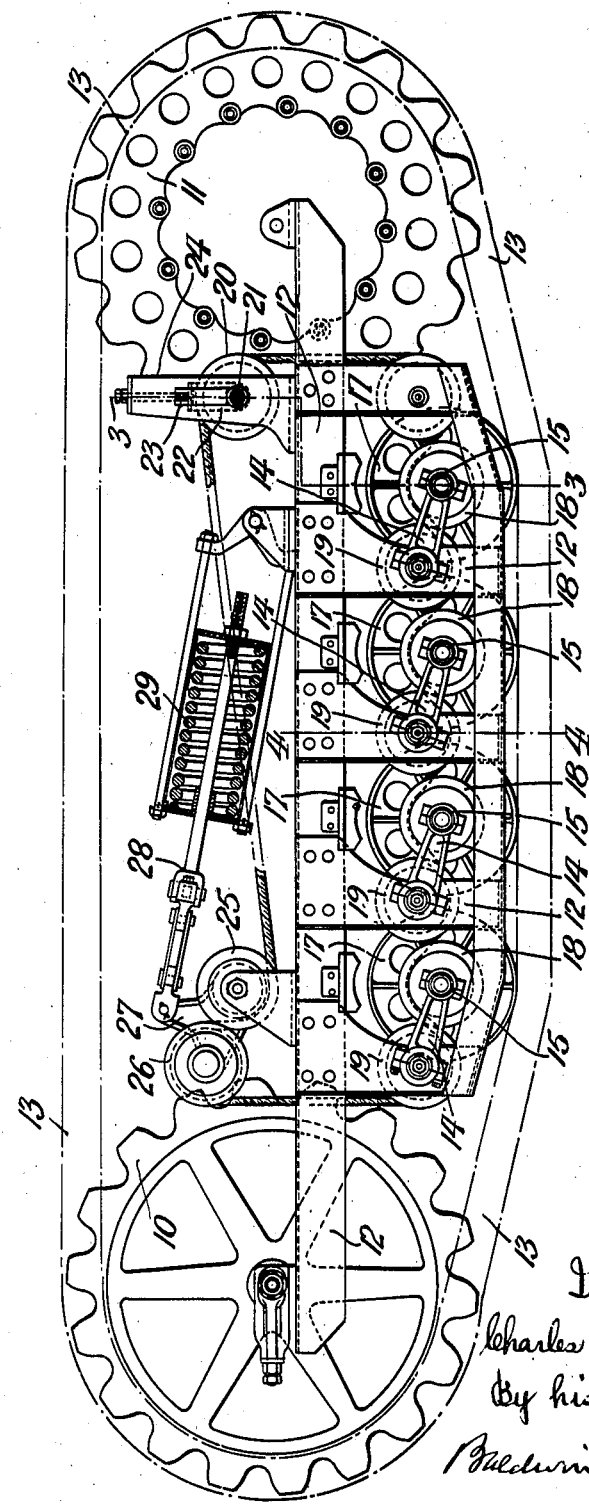
Figure 2:
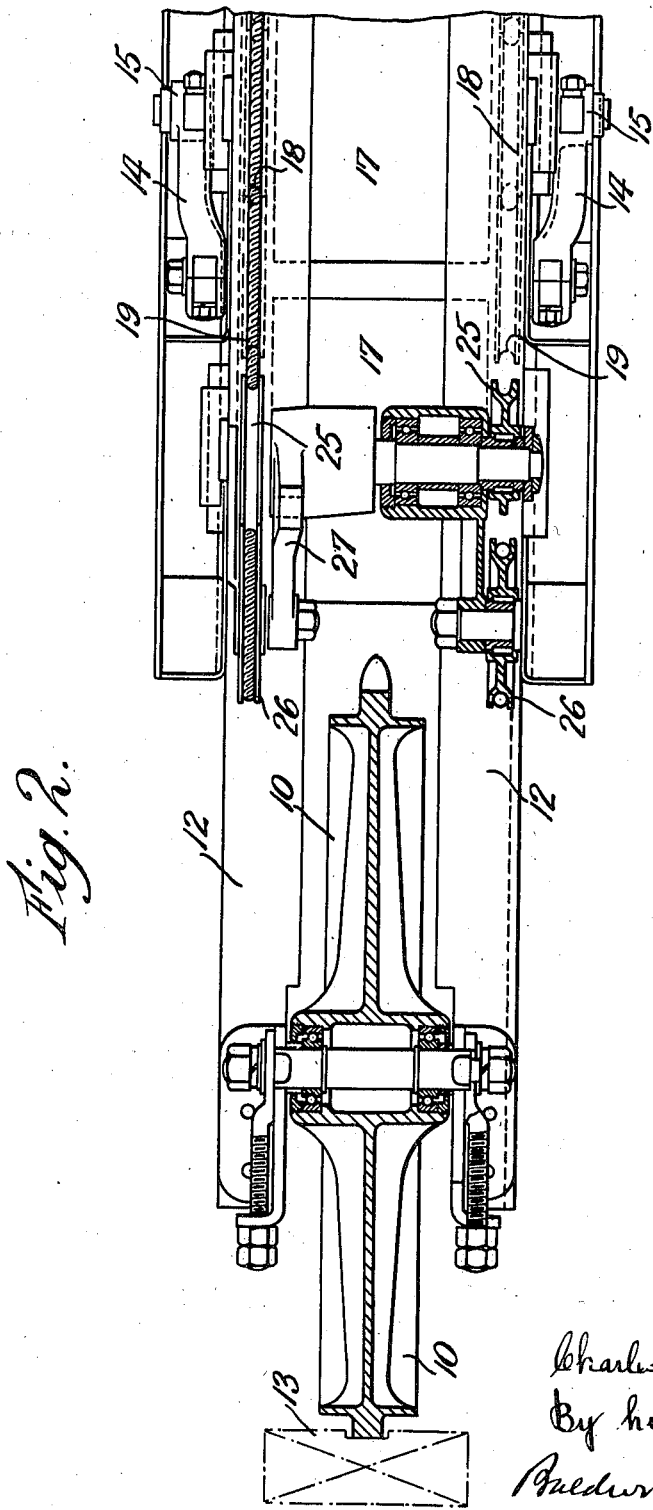

Figure 1 is a side elevation of an endless track unit; Figure 2 is a plan, partly in section to a larger scale, of the left hand end of the same; Figures 3 and 4 are transverse sections to a larger scale on the lines 3—3 and 4—4, Figure 1; Figure 5 is a side elevation of part of an endless track unit and Figure 6 is a longitudinal section; Figure 7 is an end elevation of Figure 6; Figures 8 and 9 show a side view and end view of a modification; Figures 10, 11 and 12 also show modifications.

10 and 11 are sprocket wheels mounted on a frame 12, and 13 is an endless track which runs on the sprocket wheels 10 and 11. On the frame 12 are pivotally mounted arms 14 having on their ends bearings 15 supporting the axles 16 and rollers 17 which run on the endless track 13. On the axles 16 are rotatably mounted pulleys 18 and other pulleys 19 are rotatably mounted upon the pivots of the arms 14. At the rear end of the frame are pulleys 20 whose axles 21 are carried in frames 22 which frames are adjustably supported by screws 23 in other frames 24. On the other end of the frame 12 are pulleys 25 and 26, the pulleys 26 being mounted upon pivoted levers 27 connected by a rod 28 to a spring 29.

Referring to Figures 5, 6 and 7, in this arrangement the arms 14 carrying the rollers 17 are pivoted to a girder 30 forming part of the frame and to the girder are fixed rubbing pieces 31, against which pieces 31 the arms 14 rub. In order to allow the rollers 17 to tilt, their axles are mounted in one or other of the following ways:—

In Figure 7 the axles terminate in spherical pieces 33 which are capable of turning in the bearings carried by the arms 14. In Figures 8 and 9 the axle 16 terminates in an eye 34 through which is inserted the end of the arm 14, springs 35 and 36 being inserted on each side of the eye as shown in Figure 8.

In Figure 10 the axles have curved bosses 37 at their middle points which bosses engage with screwed blocks 38 similarly curved to allow of tilting.

In Figure 11 ball bearings 39 are carried by the arms 14 in which the axles 16 run, the outer member 40 of the ball race being curved to allow movement in a curved ring 41.

In Figure 12 the axles terminate in a ball 42 fitting into a socket 43 and held in position by a plug 44.

The parts 31 which have hereinbefore been called "rubbing pieces" comprise arms which are pivotally connected at their upper ends to the frame of the vehicle, and it will be observed by reference to Figures 5 to 9, inclusive, that each of these arms has a lateral extension at its lower end which projects under an arm 14. This device limits the downward movement of the associated arm. While this device is efficient for limiting the vertical movement of the arms other means may be employed for the same purpose.

What I claim is:—

1. A frame, wheels mounted on the frame, an endless track carried by the wheels, arms pivoted to the frame, rollers on the free ends of the arms and running on the endless track, pulleys on the frame and on the axles of the rollers and a rope passing under the pulleys on the frame and over the pulleys on the roller axles.

2. A frame, wheels mounted on the frame, an endless track carried by the wheels, arms pivoted to the frame, rollers on the free ends of the arms and running on the endless track, pulleys on the frame and on the axles of the rollers, means for preventing endway motion of the axles of the rollers and a rope pasing under the pulleys on the frame and over the pulleys on the roller axles.

3. A frame, wheels mounted on the frame, an endless track carried by the wheels, arms pivoted to the frame, rollers on the free ends of the arms and running on the endless track, pulleys on the frame and on the axles of the rollers, rubbing pieces fixed to the frame and pressing against the arms carrying the rollers and a rope passing under the pulleys on the frame and over the pulleys on the roller axles.

4. A frame, wheels mounted on the frame, an endless track carried by the wheels, arms pivoted to the frame, rollers running on the endless track having axles tiltably supported in bearings at the ends of the arms, pulleys on the frame and on the axles of the rollers, and a rope passing under the pulleys on the frame and over the pulleys on the roller axles.

5. A frame, wheels mounted on the frame, an endless track carried by the wheels, arms pivoted to the frame, rollers running on the endless track having axles tiltably supported in bearings at the ends of the arms, pulleys on the frame and on the axles of the rollers, means for preventing endway motion of the axles of the rollers and a rope passing under the pulleys on the frame and over the pulleys on the roller axles.

6. A frame, wheels mounted on the frame, an endless track carried by the wheels, arms pivoted to the frame, rollers running on the endless track having axles tiltably supported in bearings at the ends of the arms, pulleys on the frame and on the axles of the rollers, rubbing pieces fixed to the frame and pressing against the arms carrying the rollers, and a rope passing under the pulleys on the frame and over the pulleys on the roller axles.

7. A frame, wheels mounted on the frame, an endless track carried by the wheels, arms pivoted to the frame, rollers on the free ends of the arms and running on the endless track, pulleys on the frame and on the axles of the rollers, a rope passing under the pulleys on the frame and over the pulleys on the roller axles, and a tightening means for the rope.

8. A frame, wheels mounted on the frame, an endless track carried by the wheels, arms pivoted to the frame, rollers on the free ends of the arms and running on the endless track, axles carrying the rollers, universal mountings in the ends of the arms for the axles, pulleys on the frame and on the axles of the rollers and a rope passing under the pulleys on the frame and over the pulleys on the roller axles.

9. A frame, wheels mounted on the frame, an endless track carried by the wheels, arms pivoted to the frame, rollers on the free ends of the arms and running on the endless track, axles carrying the rollers, universal mountings in the ends of the arms for the axles, means for preventing endwise movement of the axles, pulleys on the frame and on the axles of the rollers, and a rope passing under the pulleys on the frame and over the pulleys on the roller axles.

10. In vehicle suspension, a frame, rope guides carried by the frame, other rope guides cooperating with those first mentioned, arms pivoted to the frame and supporting said last-mentioned guides, and a rope supported on the frame and extending across both sets of guides.

11. In vehicle suspension, a frame, rope guides carried by the frame, other rope guides cooperating with those first-mentioned, arms pivoted to the frame and supporting said last-mentioned guides, an endless rope extending horizontally across both sets of guides and which has vertical end portions and an upper horizontal portion, and means engaging the rope for imparting tension thereto.

12. In vehicle suspension, a frame, rope guides carried by the frame, other rope guides cooperating with those first mentioned, arms pivoted to the frame and supporting said last-mentioned guides, a rope supported by the frame and extending across both sets of guides, and means engaging the arms to retard their movement.

13. In vehicle suspension, a frame, rope guides carried by the frame, other rope guides cooperating with those first mentioned, arms pivoted to the frame and supporting said last-mentioned guides, a rope supported by the frame and extending across both sets of guides, and means for limiting the vertical movement of the arms.

In testimony that I claim the foregoing as my invention I have signed my name this 11th day of November, 1921.

CHARLES WILLOUGHBY CLARK.